Jan. 26, 1965 T. P. M. ROUSE, JR 3,167,204
PRESSURE VESSELS

Filed May 26, 1961 3 Sheets-Sheet 1

INVENTOR.
T. P. M. ROUSE JR.

BY
ATTYS.

INVENTOR.
T. P. M. ROUSE JR.
BY W. A. Quesenberry
O. E. Hodges
ATTYS.

Jan. 26, 1965   T. P. M. ROUSE, JR   3,167,204
PRESSURE VESSELS
Filed May 26, 1961   3 Sheets-Sheet 3

INVENTOR.
T. P. M. ROUSE JR.
BY W. O. Quesenberry
D. E. Hodges
ATTYS.

United States Patent Office 3,167,204
Patented Jan. 26, 1965

3,167,204
PRESSURE VESSELS
Thomas P. M. Rouse, Jr., 17 Glenview Drive, Bristol, R. I.
Filed May 26, 1961, Ser. No. 113,591
2 Claims. (Cl. 220—5)
(Granted under Title 35, U.S. Code (1952), sec. 266)

The invention described herein may be manufactured and used by or for the Government of the United States of America for governmental purposes without the payment of any royalties thereon or therefor.

This invention relates to new constructions and methods for the construction thereof in the field of pressure vessels. More specifically it relates to such new constructions and methods for applications in torpedoes and submarine hulls.

Most external pressure hulls are constructed from an outer shell and an inner shell of sheet metal reinforced by strengthening ribs which are usually of rectangular cross section. Other methods of making pressure hulls employ cast metal or plastic cylinders with or without internal strengthening ribs, and sheet metal with externally attached strengthening ribs. Maximum vessel performance and volumetric efficiency are not possible with any of these designs. Weight, size and volumetric efficiency have a considerable effect upon vessel performance. Cost of fabrication and ease of maintenance are usually high when high volumetric efficiency and performance are required.

It is therfore an object of this invention to increase the performance of underwater vehicles and external pressure vessels by providing new constructions which enable substantial savings in weight.

Another object of this invention is to provide new constructions for increasing the volumetric efficiency of underwater vehicles and external pressure vessels.

Still another object of this invention is to provide a method for fabricating underwater vehicles and pressure vessels of the aforementioned type at lessened cost and which require less maintenance.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
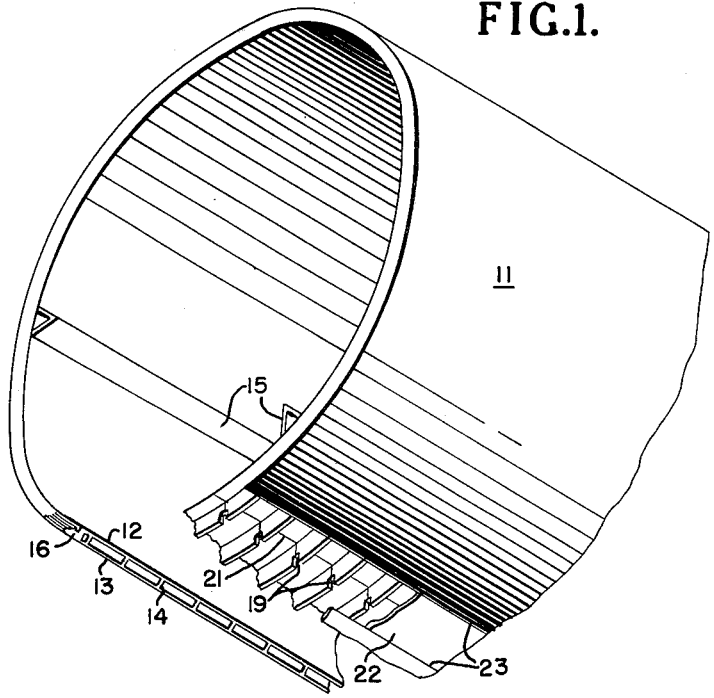
FIG. 1 is a perspective view partly in section and partly broken away of one of the embodiments of the present invention.

Referring now to the drawings wherein like reference characters designate like or corresponding parts throughout the several views, there is shown in FIG. 1 a cylindrical section 11 having an inner wall 12 and an outer wall 13 with stiffening ribs 14 between the two walls, formed integral therewith, and in a plane substantially perpendicular to the axis of the section 11.

Brackets 15 are attached to inner wall 12 and are parallel substantially to the axis of the cylinder. Joint ring 16 is positioned at the near end of the cylindrical section as viewed in the figure and is integral therewith. Notches 19 are formed in ribs 14 and are in alignment. Mating ends of inner shell 12 and ribs 14 are jointed together at seam 21 by a weld. Section 22 occupies a cut-out part of outer wall 13 and is joined thereto at seams 23 by welds.

Figure 2:
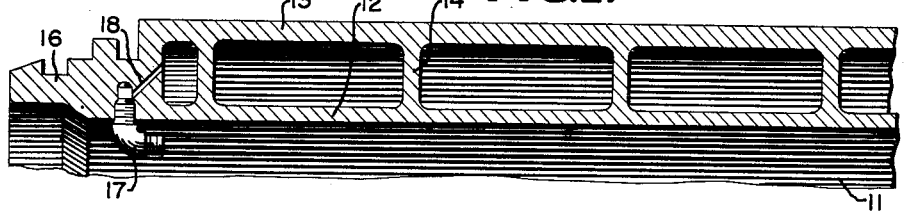
FIG. 2 is a fragmentary sectional view greatly enlarged of the embodiment of FIG. 1.

There is shown in FIG. 2 the section 11 with inner wall 12, outer wall 13, and ribs 14 between the two walls and integral therewith. Joint ring 16 is formed integrally with the inner and outer walls and is adapted to be used in conjunction with another joint structure attached to another section for the purpose of joining the two sections. Ribs 14 cause annular chambers to be formed between walls 12 and 13. One end of fitting 17 is attached to joint ring 16 and the other end of fitting 17 is adapted to be coupled to a fluid delivery valve. Passageway 18 communicates between fitting 17 and an annular chamber formed between joint ring 16 and the nearest rib 14.

Figure 3:
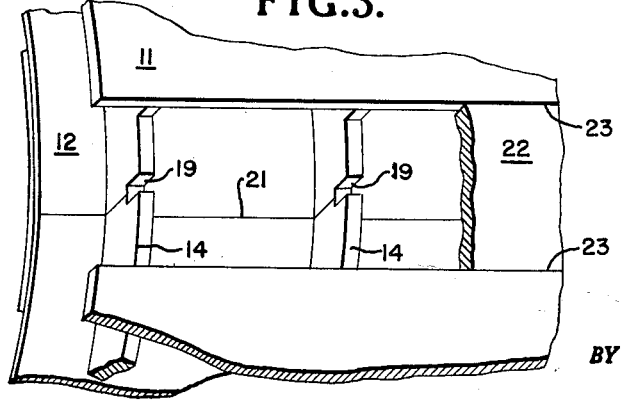
FIG. 3 is an enlarged perspective view, partly broken away, of that portion of the embodiment of FIG. 1 where a seam occurs.

There is shown in FIG. 3 the joining details of section 11. The meeting ends of inner wall 12 are joined together by a weld at seam 21, the weld also joining ribs 14 together at the ends where they meet. A portion of outer wall 13 is removed along with such parts of ribs 14 as necessary to expose inner wall 12 and ribs 14 for the purpose of completing the seam. Section 22 occupies the cut-out area in outer wall 13 and is joined to outer wall 13 at seams 23 by welds.

Figure 4:
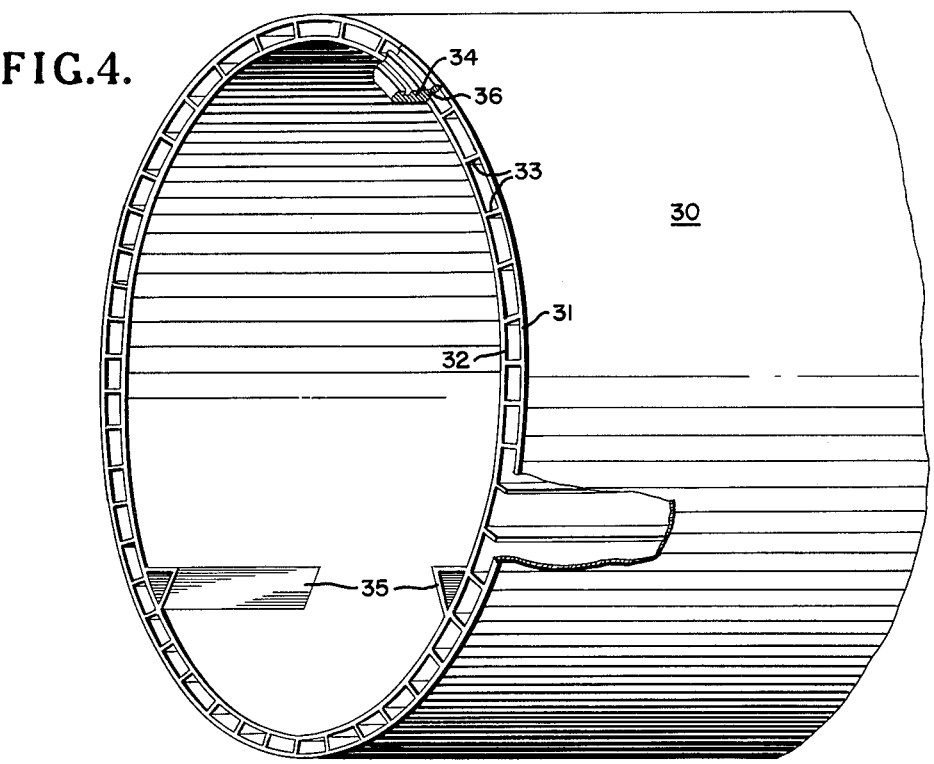
FIG. 4 is a perspective view, partly broken away, of another embodiment of the instant invention.

FIG. 4 shows a cylindrical section 30 having an outer wall 31 and an inner wall 32 with ribs 33 between the two walls, formed integral therewith and substantially parallel to the axis of section 30. Joint ring 34 is attached to cylindrical section 30 by a weld at the end adjacent thereto and is provided with annular groove 36 in the surface which abuts section 30. Brackets 35 are formed integral with inner wall 32 of section 30 and are substantially parallel to the axis of said section.

Figure 5:
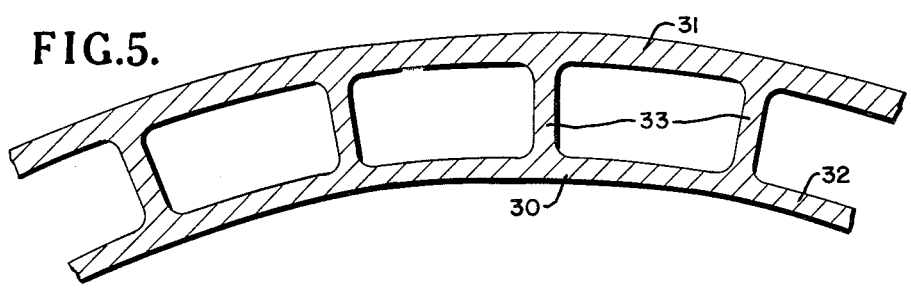
FIG. 5 is an enlarged partial edge view of the embodiment of FIG. 4.

There is shown in FIG. 5 a sectional view of a portion of cylindrical section 30 which illustrates in greater detail the outer wall 31 and the inner wall 32 with stiffening ribs 33 therebetween and integral therewith. Ribs 33 are substantially parallel to the axis of section 30.

Figure 6:
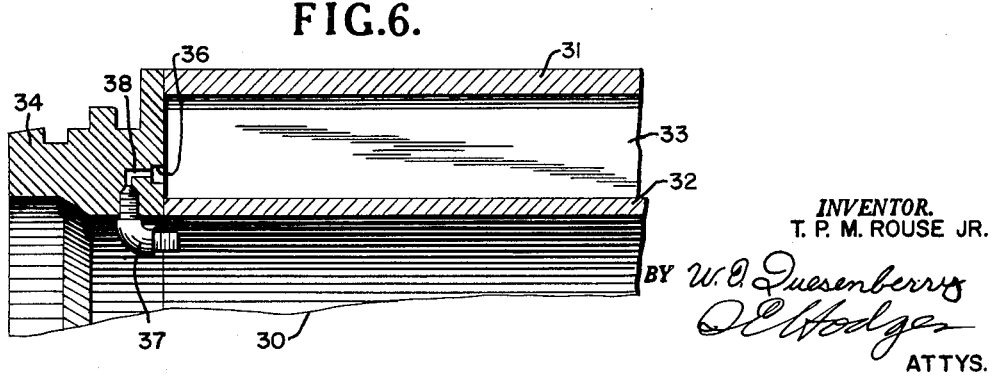
FIG. 6 is a fragmentary sectional view of the embodiment of FIG. 4.

In FIG. 6 is shown section 30 with inner wall 32 and outer wall 31. Joint ring 34 is attached to an end of section 30 by a weld and is provided with annular groove 36 in the face abutting the section. Passageway 38 communicates with the groove 36 and therefore with the chambers formed between each pair of adjacent ribs 33. Fitting 37 is attached to joint ring 34 and communicates with passageway 38, and is adapted to be coupled to a fluid delivery valve.

Figure 7A:
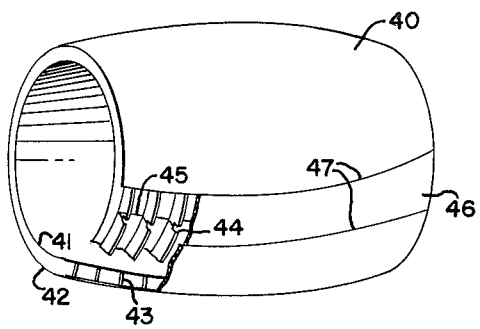
FIG. 7a is a perspective view of another embodiment of the invention partly in section and partly broken away.

In FIG. 7a is shown a barrel-shaped section 40 having inner wall 41 and outer wall 42 with ribs 43 therebetween, formed integral therewith, and in a plane substantially perpendicular to the axis of the section. Ribs 43 are provided with notches 44 which are in alignment. Meeting ends of inner wall 41 and ribs 43 are joined at seam 45 by a weld. A portion of outer wall 42 is cut out and removed in order to complete seam 45 and section 46 is positioned in the cut-out section, portion 46 being joined to outer wall 42 at seams 47 by welds.

Figure 7B:
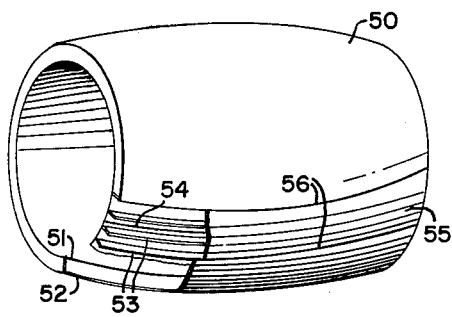
FIG. 7b is a view similar to FIG. 7a of an alternative form of the device.

In FIG. 7b is shown a barrel-shaped section 50 having inner wall 51 and outer wall 52 with ribs 53 between the two walls, formed integral therewith, and running longitudinally the length of the section. The meeting faces of inner wall 51 are joined at seam 54 by a weld. A portion of outer wall 52 is cut out and removed in order to complete the seam 54 and section 55 is inserted in the cut-out portion. Section 55 is joined to outer wall 52 at seams 56 by welds.

Figure 8A:
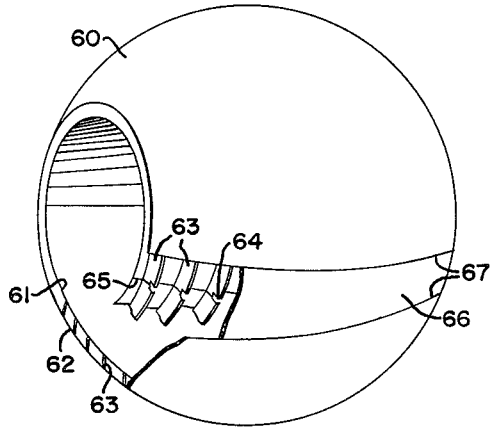
FIG. 8a illustrates still another embodiment of the invention, partly in section and partly broken away.

In FIG. 8a is shown a section of a hollow sphere having inner wall 61 and outer wall 62 with ribs 63 between the two walls, integral therewith, and substantially perpendicular to that axis of the sphere which is perpendicular to the flat end portion. The meeting ends of wall 61 and ribs 63 are joined at seam 65 by a weld. Ribs 63 are provided with notches 64, said notches being in alignment. A strip of outer wall 62 is cut out and removed in order to complete seam 65 and strip 66 is positioned in the cut-out section. Strip 66 is joined to the outer wall 62 at seam 67 by a weld.

Figure 8B:
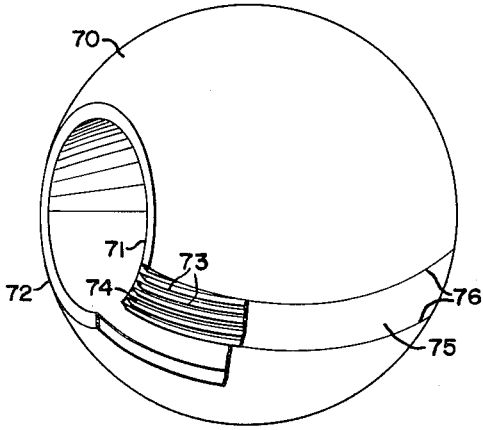
FIG. 8b is a view similar to FIG. 8a of an alternate form of the device.

There is shown in FIG. 8b a hollow section of a sphere 70, having an inner wall 71 and an outer wall 72 with ribs 73 positioned between the two walls, integral therewith, and running substantially perpendicular to the direction in which the ribs run in FIG. 8a. The meeting ends of inner wall 71 are joined at seam 74 by a weld. A strip of outer wall 72 is cut out and removed in order to complete seam 74 and strip 75 is inserted in the cut-out strip. Strip 75 is joined to outer wall 72 at seams 76 by welds.

Figure 9A:
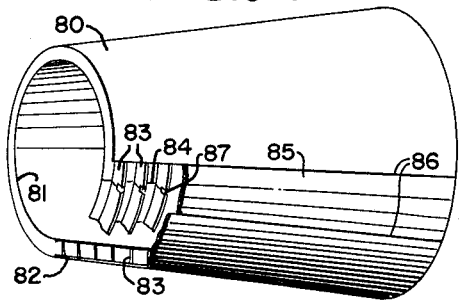
FIG. 9a illustrates still another embodiment of the invention, partly in section and partly broken away.

In FIG. 9a is shown a frusto-conical section 80 having an inner wall 81 and outer wall 82 with ribs 83 positioned therebetween, integral therewith, and being essentially perpendicular to the axis of the cone. The meeting ends of inner wall 81 are joined at seam 84 by weld and ribs 83 are further provided with notches 87 which are in alignment. A strip of outer wall 82 is cut out and removed in order to complete seam 84 and strip 85 is inserted in the cut out strip. Strip 85 is joined to outer wall 82 at seams 86 by welds.

Figure 9B:
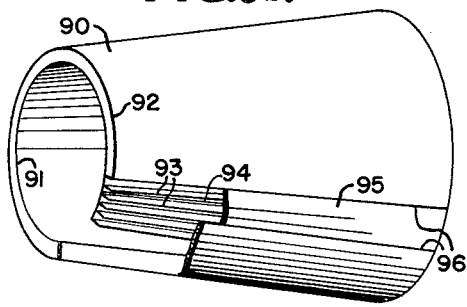
FIG. 9b is a view similar to FIG. 9a of an alternative form of the device.

There is shown in FIG. 9b a frusto-conical section 90 having an inner wall 91 and outer wall 92 with ribs 93 positioned between the two walls, integral therewith, and running the length of the section. The meeting ends of inner wall 91 are joined at seam 94 by a weld. A portion of outer wall 92 is cut out and removed in order to allow completion of seam 94 and strip 95 inserted in the cut-out portion. Strip 95 is joined to outer wall 92 at seams 96 by welds.

The embodiments in the figures are familiar geometrical shapes and are made by first extruding a sheet of material consisting of an inner wall and an outer wall with strengthening ribs therebetween. Once this sheet of material has been extruded it is then rolled into the shape of a cylinder and the meeting ends of the inner wall are welded together. In order to weld the inner wall it is necessary to cut out a portion of the outer wall in order to expose the meeting ends of the inner wall. Then in order to restore the outer wall a section of a piece of material is cut and placed in the cut-out portion of the outer wall and welded in position.

Alternatively, a cylindrical shape may be extruded in one piece with no seams whatsoever when the strengthening ribs are parallel to the axis thereof. The embodiment of the invention is shown in FIGS. 4, 5 and 6 and is preferable to a shape having seams.

Having obtained a cylinder as aforedescribed with or without seams, as the case may be, the cylinder may then be stretch formed by means of a mandrel to form the barrel shape shown in FIG. 7a and 7b.

It will be noted that in the cylinder of FIGS. 1, 2 and 3, the strengthening ribs are substantially perpendicular to the axis of the cylinder while in the cylinder of FIGS. 4, 5 and 6 the ribs are substantially parallel to the axis of the cylinder. These two cylindrical sections can be made by rolling the sheet in the manner desired to orient the ribs properly.

The sections of FIGS. 8a and 8b may be made by taking the extruded sheet material and forming it over a form to produce the desired shape. The meeting ends of the inner wall are then welded and a section of the outer wall is removed in order to allow this welding to take place. Then a separate strip of material is reinserted in the cut-out portion and welded down to restore the integrity of the outer wall. It will be noted that the direction of the ribs in FIGS. 8a and 8b are substantially 90° to each other. The orientation of the ribs depends upon the way in which the sheet extruded material is rolled.

In the embodiment shown in FIGS. 9a and 9b a sheet of extruded material is first cut to the desired shape so that upon rolling, a cone or frusto-cone will result. The meeting ends of the inner wall are welded together, it being necessary to remove a strip of the outer wall in order to complete this welding. Then in order to restore the integrity of the outer wall a strip of material is inserted in the cut-out portion thereof and welded down. It will be noticed that the direction of the ribs in FIGS. 9a and 9b are subsantially at 90° to each other. This again depends upon the way in which the sheet extruded material is rolled.

In all cases where the strengthening ribs are substantially perpendicular to the axis of the particular section it is necessary for each rib to have a notch in order that there be communication between the compartments formed between the ribs and inner and outer walls. Such notches are cut into the ribs after a portion of the outer wall is removed and before the welding of the meeting faces of the inner wall takes place. While applicant's disclosed embodiments are familiar geometrical shapes, the invention is by no means limited to such, for one may take the extruded sheet material and form it over any shaped die, as desired. It is not necessary that the direction of the strengthening ribs be as applicant has shown them in the disclosed embodiments as they may be oriented in any direction.

The preferred material for use in making these extrusions is aluminum but many other materials are available and are a matter of choice.

Mounting brackets, pads, rails, etc., of uniform axial configuration can be extruded integrally and the undesired portions machined away. Alternatively, they may be welded to the inner wall of the section for attachment. Joint rings or other attaching devices may be extruded integrally in the case of the embodiments in which they run parallel to the strengthening ribs or, alternatively, may be welded to the section. In the case of the welded joint ring or other attaching device, an annular groove is provided in the face thereof which abuts the section to which it is welded in order that there be communication between the cells formed between the inner and outer walls and adjoining ribs, as such cells are used for fluid storage. The fluid may be a liquid or a gas or a combination of the two. Alternatively, the cells may be filled with sound absorbing material or ballast. Foaming of attenuating material in the cells may be accomplished if desired.

Applicant's new structure makes possible previously impossible weight savings and volumetric efficiency. Applicant's designs result in a lighter structure than was previously possible to withstand the same pressure. Applicant's designs also have far greater volumetric efficiencies than previous configurations. When the volume of the cells is considered, the volumetric efficiency of applicant's structure is in the neighborhood of 90%.

What is claimed is:

1. In an underwater vehicle of the character disclosed, an external pressure hull comprising an inner metallic shell having at least one circular and planar opening therein,
an outer metallic shell substantially concentric with the inner shell and spaced therefrom by a plurality of individual, flat and mutually parallel metallic strengthening ribs integrally formed with and positioned entirely between said inner and outer shells in parallel relationship with the axis of concentricity of said shells,
at least one joint ring attached to said inner and outer shells at said opening sealedly closing the space between said inner and outer shells and adapted to be used for joining said hull to another metal section,
said strengthening ribs thereby forming a plurality of chambers in said space between said inner and outer shells,
a fluid delivery fitting connected to said joint ring and providing a fluid passage means between the interior of the inner shell and at least one of said plurality of chambers,
and an annular groove in asid joint ring on a surface thereof exposed to all of said chambers for providing fluid communication between the mutually adjacent chambers.

2. In an underwater vehicle of the type described, an external pressure hull comprising an inner metallic shell having at least one circular and planar opening therein,
an outer metallic shell substantially concentric with the inner shell and spaced therefrom by a plurality of individual, flat and mutually parallel metallic strengthening ribs integrally formed with and positioned entirely between said inner and outer shells in substantially perpendicular relationship with the axis of concentricity of said shells,
at least one joint ring attached to said inner and outer shells at said opening sealedly closing the space between said inner and outer shells and adapted to be used for joining said hull to another metal section,
said strengthening ribs thereby forming a plurality of chambers in said space between said inner and outer shells,
a fluid delivery fitting connected to said joint ring and providing a fluid passage means between the interior of the inner shell and at least one of said plurality of chambers,
and a notch in each of said strengthening ribs for providing fluid communication between the mutually adjacent chambers.

References Cited by the Examiner

UNITED STATES PATENTS

| | | | |
|---|---|---|---|
| 67,035 | 7/67 | Foley | 61—45 |
| 724,675 | 4/03 | Decker | 138—148 X |
| 1,078,906 | 11/13 | Eldred | 29—473.5 |
| 1,173,431 | 2/16 | Jacobs | 114—16 |
| 1,712,803 | 5/29 | Wood | 138—148 X |
| 2,149,232 | 2/39 | Schmidtmann | 61—45 |
| 2,371,348 | 3/45 | Murray | 29—473.5 |
| 2,417,873 | 3/47 | Huber. | |
| 2,685,858 | 8/54 | Harrison | 114—16 |
| 2,686,473 | 8/54 | Vogel | 102—49 |
| 2,933,214 | 4/60 | Douyard | 220—3 |
| 2,940,734 | 6/60 | Harvey | 220—3 |
| 2,955,415 | 10/60 | Long | 220—15 X |
| 3,016,866 | 1/62 | Walker | 114—125 |
| 3,043,103 | 7/62 | Dent et al. | 60—35.6 |
| 3,046,736 | 7/62 | Thomson | 102—49 |
| 3,103,885 | 9/63 | McLauchlan | 102—49 |
| 3,110,754 | 11/63 | Witort et al. | 220—3.7 X |

FOREIGN PATENTS

| | | |
|---|---|---|
| 24,959 | 1899 | Great Britain. |
| 254,220 | 7/26 | Great Britain. |
| 484,953 | 5/38 | Great Britain. |

THERON E. CONDON, *Primary Examiner.*

ARTHUR M. HORTON, SAMUEL BOYD, *Examiners.*